United States Patent [19]
Paschal

[11] Patent Number: 5,329,543
[45] Date of Patent: Jul. 12, 1994

[54] PULSED LASER USING A MOVING INTRACAVITY PHOTON DEFLECTOR AS A BEAM EXTRACTOR

[76] Inventor: Richard C. Paschal, 6608 Jocelyn Hollow Rd., Nashville, Tenn. 37205

[21] Appl. No.: 933,860

[22] Filed: Aug. 24, 1992

[51] Int. Cl.$^5$ .............................................. H01S 3/08
[52] U.S. Cl. .......................................... 372/98; 372/9; 372/92; 372/108; 372/107
[58] Field of Search ................... 372/92, 15, 9, 68, 20, 372/98, 108, 107

[56] References Cited

U.S. PATENT DOCUMENTS

| | | | |
|---|---|---|---|
| 3,670,259 | 6/1972 | Young | 372/15 |
| 3,711,788 | 1/1973 | Forkner | 372/15 |
| 3,725,817 | 4/1973 | Nolan | 372/15 |
| 3,769,608 | 10/1973 | Vargady | 372/15 |
| 4,823,351 | 4/1989 | Endemann et al. | 372/9 |
| 4,862,468 | 8/1989 | Fink | 372/15 |
| 4,998,259 | 3/1991 | Chandra et al. | 372/15 |
| 5,029,023 | 7/1991 | Bearden et al. | 372/9 |
| 5,107,509 | 4/1992 | Esterowitz et al. | 372/20 |

Primary Examiner—Leon Scott, Jr.

[57] ABSTRACT

A pulsed laser utilizing an oscillating or rotating intra cavity photon deflector means to extract a beam transverse to the long axis of the resonator from intracavity power. The moving photon deflector is supported and set into motion either mechanically or electromagnetically within the resonator and in the path of lasing photons, thereby intercepting and deflecting photons out of the resonator.

Movement of the deflector within the path of lasing photons results in the circumferential deflection of photons with the most intense concentration being deflected from that portion of the surface of the deflector which first intercepts the circulating intracavity photon stream. As lasing photons are deflected from the leading edge of the deflector, lasing action is instantaneously reestablished after the trailing edge moves through the photon stream. Wherever the deflector does not intersect the normal trajectory of photons in the laser cavity, lasing action is automatically reestablished. The invention can be incorporated with both open and closed cavity laser designs.

10 Claims, 4 Drawing Sheets

PULSED LASER USING A MOVING INTRACAVITY PHOTON DEFLECTOR AS A BEAM EXTRACTOR

BACKGROUND OF THE INVENTION

The present invention relates to pulsed lasers, specifically to the extraction of intense pulses using an intracavity photon deflector as a beam extractor. This invention could prove technically less difficult to manufacture and, therefore, more cost efficient than some existing pulsed laser technology. Pulsed lasers produce laser pulses having high peak power with short duration and have numerous applications in industry, education, and science.

Conventional methods of producing pulsed beams from laser cavities include Q-switching by means of acoustic-optic or electro-optic modulators and mode-locking. Such methods are relatively expensive to implement, requiring the use of special crystals and sophisticated electronics. The intracavity moving photon deflector is simple in design, produces a well-defined beam and does so with higher instantaneous output power than is possible by mechanically chopping the output beam of conventional lasers.

Where lasers are used as analytical tools, results are often limited by available optical power. In many applications, a train of laser pulses of high peak power might be preferable to a continuous beam of much lower power, even if the average power is lower. For example, biological samples are often degraded by heat, so that the intracavity photon deflector concept might allow an advantage in a particular analysis-such as Ramen spectroscopy-which would otherwise be impossible. The present invention could give rise to new analytical technology as well as being implemented to upgrade or retrofit existing equipment.

Physicists and engineers involved in developing laser technology face rapidly expanding application of lasers to meet human needs. Available laser technology tends to drive applications so that a new and useful laser concept with a particular set of beneficial characteristics would then lead to the development of suitable applications. There are probably many applications which will become apparent as we come to understand the characteristics of the deflected beam.

Further objectives and advantages of the invention will become apparent from a consideration of the drawings and ensuing description of it.

SUMMARY OF THE INVENTION

The description of the invention will be presented primarily in association with its application to a gas laser and in particular as applied to a Helium-Neon laser. As will become apparent, the invention can be applied to both gas and solid laser designs.

In most lasers, and particularly in continuous-wave lasers, the circulating or intracavity power in the optical resonator is 20 to 100 times as great as that in the external beam. The general purpose of the invention is to provide a means of extracting a transverse pulsed beam from this higher intracavity circulating power through the utilization of a moving intracavity photon deflector.

Other objectives of the invention are to provide a moving intracavity photon deflector which can extract intracavity power from both gas and solid lasers, to provide a means of extracting the higher intracavity circulating power which is relatively uncomplicated and inexpensive to manufacture, to provide a means of deflecting and recombining photons traveling in both directions within the resonator, and to provide a pulsed laser physically designed to emit a beam transverse to the long axis of the resonator thus establishing a unique engineering application potential. A further objective of the present invention is to provide a pulsed mode laser device capable of producing dual beams of equal energy. The present invention relates to an intracavity moving photon deflector that is associated with otherwise conventional laser designs to provide a means of extracting intracavity power.

In the case of a closed cavity gas laser a moving intracavity photon deflector means is housed within the laser tube. The deflector occupies an area within the laser tube that is primarily within the photon stream, thus allowing lasing photons to travel entirely or in part around the periphery of the deflector. Any movement of the deflector results in the interception of lasing photons at the leading surface of the deflector and the deflection of these photons out of the resonator through flat exit windows in the tube and at acute angles with respect to the long axis of the resonator. The deflector can be supported and set into motion either mechanically or electromagnetically and its motion regulated and controlled. For example, the deflector could be attached to the end of a flexible support arm and anchored in one resonator mirror, mirror mount, or from the tube wall. Here movement could be initiated by an electromagnetic field, mechanical oscillation of the support arm, or by some form of vibrational transfer from a source external to the laser tube. The deflector could also be levitated and set into motion entirely by an electromagnetic field. Whether supported by a mechanical arm or levitated electromagnetically, these designs would involve the deflectors' being entirely enclosed within the laser tube.

Movement of a spherical deflector within the bore will result in a circumferential deflection of lasing photons with the most intense concentration being reflected from the area of the sphere which first intercepts the circulating intracavity photon stream. As the reflective sphere oscillates from one external point of its motion to the other, it will generate two pulses of laser light: once on going forward through the intracavity beam and once on the return path. As lasing photons are reflected from the leading edge of the sphere, lasing action is instantaneously reestablished as the trailing edge of the sphere moves through the circulating photon stream. Wherever the sphere does not intersect the normal trajectory of photons in the laser cavity, laser action is automatically reestablished. Exit apertures for the deflected beams are provided in the spider and outer housing and flat surfaced windows are provided in the tube to permit beam escape and to minimize beam distortion as the beams are emitted.

The invention can easily be incorporated with the open cavity laser concept as the open cavity provides access and space for the utilization of some form of automated rotating beam deflector. In this design an electric motor is used to rotate a precision disc with evenly spaced deflectors around its circumference. The disc is positioned so that, when rotated, the deflectors on its periphery pass through the intracavity circulating photon stream thus intercepting and deflecting photons out of the resonator. In this configuration the invention is applicable to a solid laser medium since one or both of the resonator mirrors are generally separated from the laser medium. The invention calls for optics to refocus and combine the heaviest concentrations of deflected photons into a single beam.

It is recognized that the composition and mechanical configuration of the deflector could be altered to meet a variety of engineering objectives. It should be noted that only for the sake of discussion will a spherical deflector be described as a part of the invention. It is recognized that any variation in deflector composition and or morphology would not affect the novelty of the invention. Given the higher intracavity circulating power the invention will produce a beam of high peak power in pulses lasting a few milliseconds.

BRIEF DESCRIPTION OF THE DRAWINGS

FIG. 1 is a somewhat schematic cross sectional view of a laser equipped according to the present invention and illustrating the unique design and physical structure of the invention as it relates to gas lasers.

FIG. 2 is a somewhat schematic cross sectional view of a mechanically supported moving photon deflector. FIG. 2 illustrates diagrammatically the movement of a photon deflector through lasing photons, the deflection of intercepted photons from the leading surface of the deflector, and the extraction of a beam transverse to the long axis of the resonator. Electromagnets 12 provide a means of initiating, maintaining, and controlling the movement of the photon deflector.

FIG. 3 is a somewhat schematic cross sectional view of a motor-driven rotating photon deflector means housed within the resonator of an open cavity laser. In FIG. 3 one of the resonator mirrors is external to the tube containing the lasing medium, thus providing space for the rotating beam deflector mechanism when incorporated with gas or solid laser designs. Here two beams are depicted being deflected out of the resonator and optically combined into a single beam.

FIG. 4 is a somewhat schematic cross sectional frontal view of a rotating photon deflector means. This photon deflector consists of a rotating wheel with beveled reflectors equally spaced around the circumference of the wheel allowing time intervals for lasing action to be reestablished in the resonator between outcoupling of the deflected beam.

FIG. 5 is a somewhat schematic cross sectional side view of the rotating photon deflector in FIG. 4 illustrating the interception and deflection of photons moving in both directions between the resonator mirrors.

In FIG. 5 two beams are depicted which result from the movement of the beveled reflectors through photons moving in opposite directions within the resonator.

Reference Numbers for Drawings

2. Circulating Lasing Photon Stream
5. Output Beam
6. Laser Tube
8. Aperture in Spider for Deflected Photons to Exit
10. Flat Surface Photon Exit Window in Glass Tube
12. Electromagnets
14. Area Where Photon Deflector Moves Within Resonator Photon Beam
16. Beam Guide Optics
18. Outer Housing
24. Gas Reservoir
26. Bore
28. Reflective Resonator Mirror
30. Power Supply
32. Photon Deflector Support Arm Anchored in Mirror
34. Photon Deflector Support Arm
38. Photon Deflector
40. Photon Deflector At Oscillation End Point 1
41. Photon Deflector At Oscillation End Point 2
42. Space Occupied by Photon Deflector At Oscillation End Point
44. Total Photon Deflector Oscillation Space
46. Space Unoccupied By Photon Deflector When it Occupies Space 42
48. Electric Motor
50. Rotating Photon Deflector Wheel
51. Space Between Sealed Laser Tube And Remote Resonator Mirror
52. Beveled Reflector For Photon Deflection
54. Deflected Photon Beam
56. Beam Combining Optics
58. Exit Aperture In Outer Housing
60. Rotating Motor Axle
62. Space Between Beveled Reflector To Allow Lasing To Be Reestablished

DESCRIPTION OF THE PREFERRED EMBODIMENT

Figure 1:
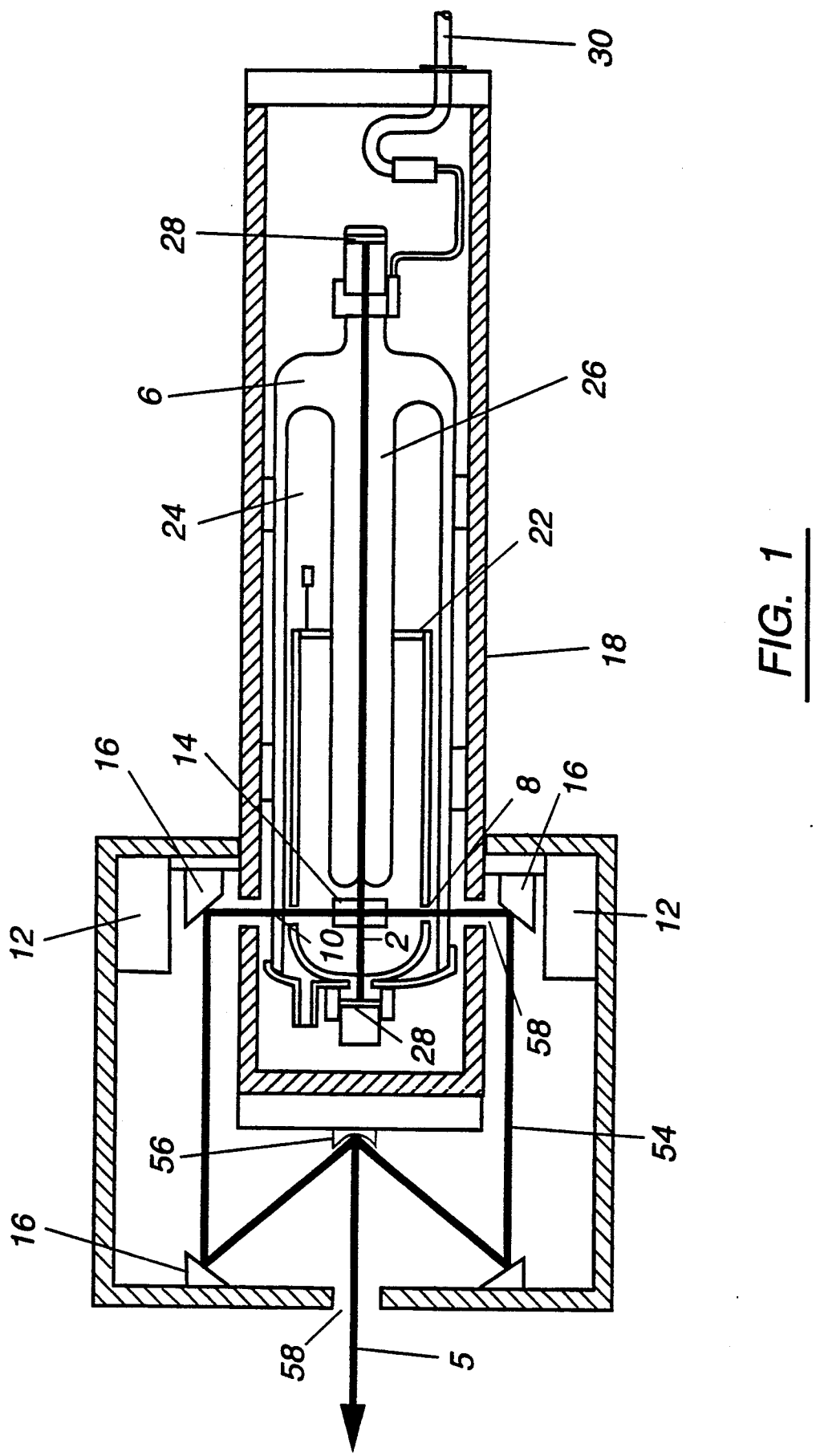
FIG. 1
Figure 2:
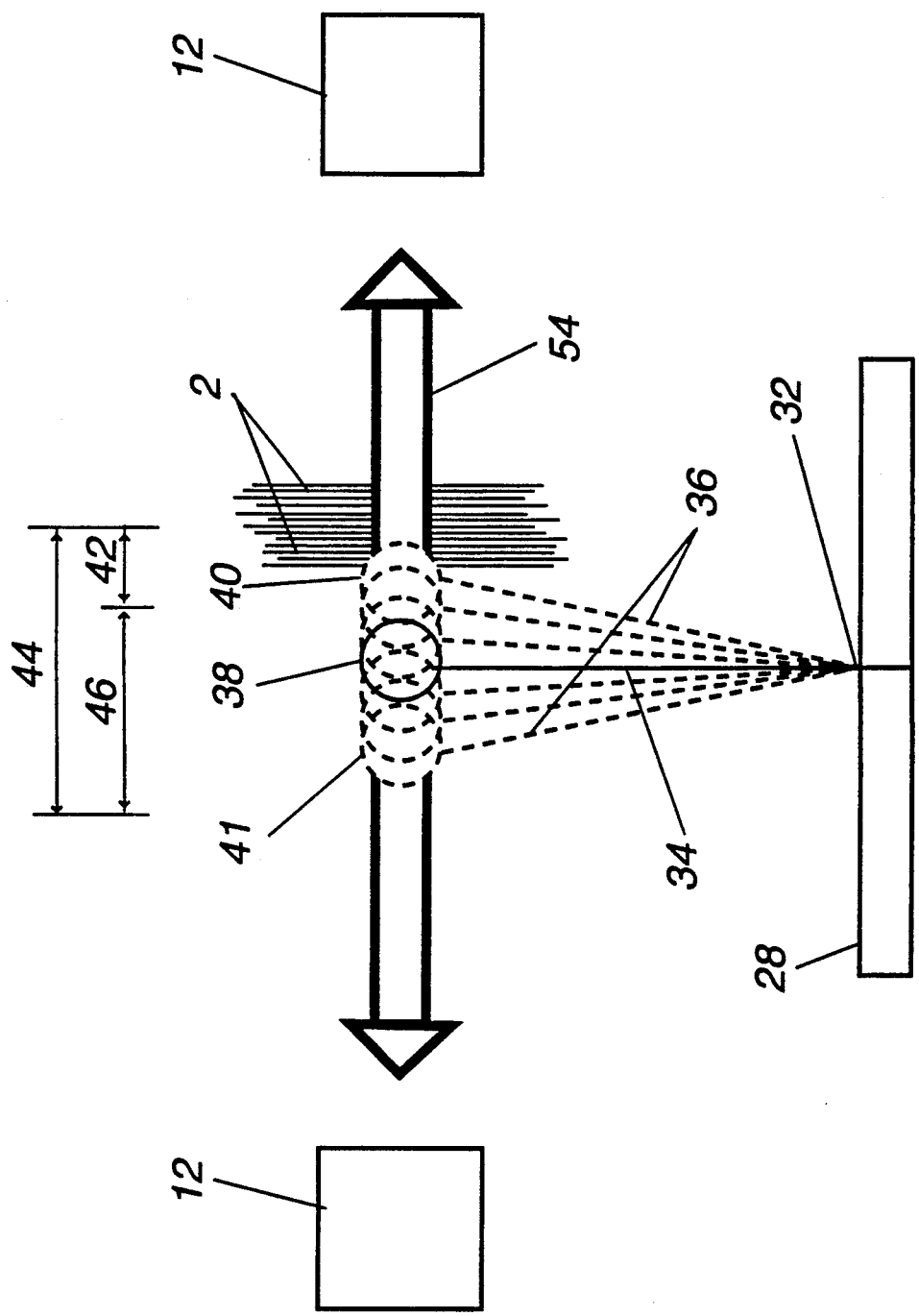
FIG. 2
Figure 3:
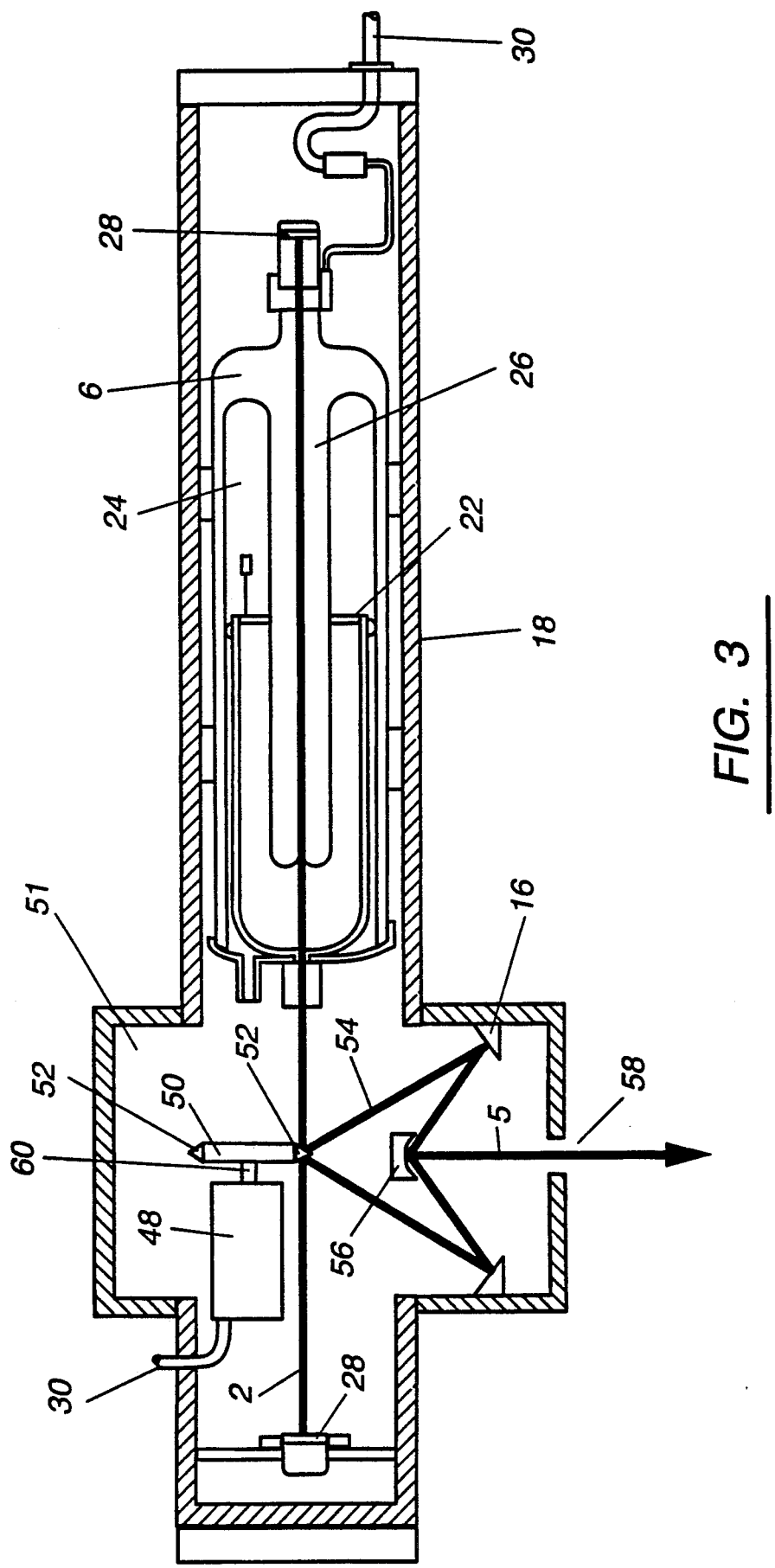
FIG. 3
Figure 5:
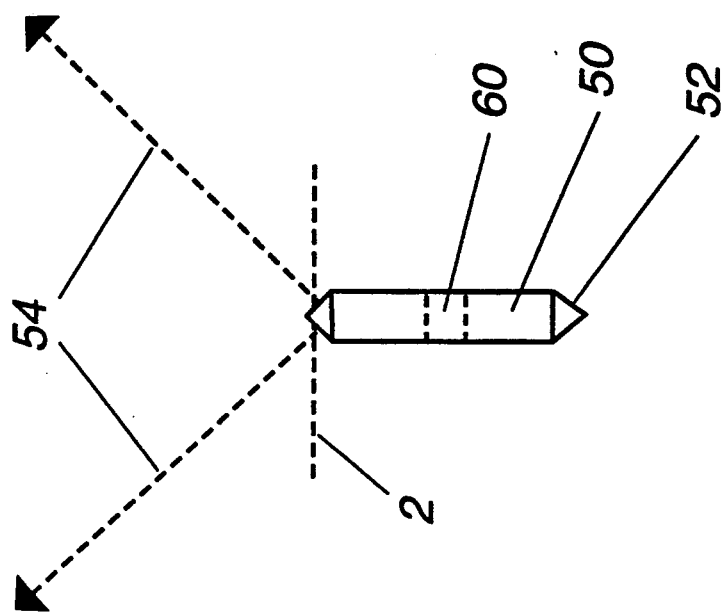
FIG. 5
Figure 4:
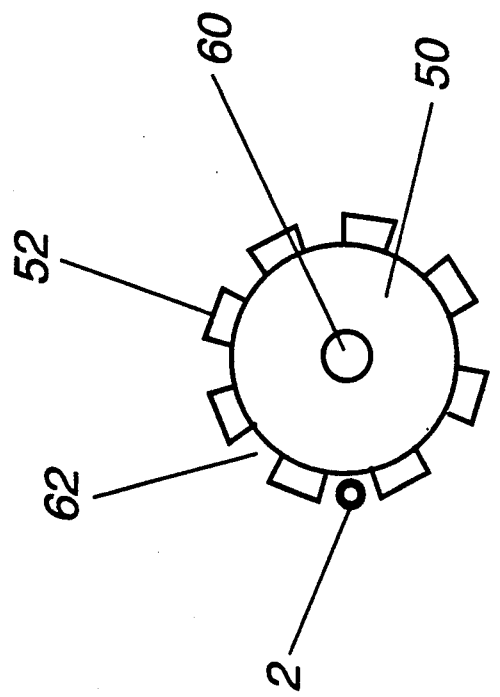
FIG. 4

With reference to the drawings, it should be noted that reference numbers used to identify specific parts are common to each of the drawings and are identified in the parts list. The parts list contains some but does not necessarily identify all components required for laser function as the primary objective will be to identify those components which are unique to the invention. In FIG. 1 there is shown a gas laser system equipped with two reflective mirrors 28. Between mirrors 28 an intracavity photon deflector is inserted to intercept and deflect photons from the intra-cavity circulating photon stream 2, thus generating the extracted beams 54. The interception and deflection of photons in area 14 of FIG. 1 is accomplished by means of an oscillating intracavity reflective photon deflector mechanism within the intra-cavity circulating photon stream 2. FIG. 1 shows deflected beams 54 exiting tube 6 through spider apertures 8, flat surfaced tube windows 10, and outer housing apertures 58. Deflected beams 54 are shown striking beam guides 16 and being combined into a single output beam 5 by beam combining optics 56. The photon deflector mechanism within area 14 of FIG. 1 is depicted in detail in FIG. 2. FIG. 2 depicts an oscillating photon deflector sphere 38 with a highly reflective surface and a magnetic core. The photon deflector sphere 38 is shown being mechanically supported by support arm 34 which is anchored in mirror 28 at point 32. Support arm 34 is flexible allowing the deflector sphere 38 to oscillate under the influence of a regulated fluctuating electromagnetic field generated by electromagnets 12. It is recognized that the magnetic field generated by electromagnets 12 will be appropriately insulated as to minimize any detrimental effect on the circulating photon stream 2. FIG. 2 diagrammatically depicts the oscillating path of deflector sphere 38 through circulating photon stream 2 as a result of the influence of electromagnets 12. Electromagnets 12 provide a controllable electromagnetic field for varying the rate and timing of the motion of deflector sphere 38 to produce overlapping and nonoverlapping pulses thus enabling the extraction of coherent or incoherent light. Deflector sphere 38 is shown oscillating between extremal positions 40 and 41 and intercepting and deflecting photons from the circulating photon stream 2 to form deflected beams 54. The movement of photon deflector sphere 38 into the circulating lasing photon stream 2 results in the interception of photons at the leading surface of the deflector and the deflection of these photons out of the resonator. Movement of the sphere between positions 40 and 41 results in a circumferential deflection of photons with the most intense deflected photon concentration being at the sphere's leading surface area. Thus the oscillating motion of photon deflector sphere 38 will generate two pulsed photon beams 54 as the sphere oscillates between positions 40 and 41. The movement of photon deflector sphere 38 between positions 40 and 41 results in the interception of lasing photons on the leading surface of the deflector. Lasing is terminated while the deflector is in the intra-cavity photon stream, but is reestablished instantaneously behind the trailing surface of the deflector. The movement of deflector sphere 38 within space 44 continually provides clearance for the instantaneous reestablishment of lasing photons within bore 26. When deflector sphere 38 terminates one direction of motion at position 42, space 46 is replenished with lasing photons awaiting the return of the sphere and the resulting interception and deflection of photons within its path. Therefore, pulsed beams 54 are continually generated by movement of sphere 38 within space 44. In FIG. 3 there is shown a laser system which incorporates the invention with the open cavity laser concept in that space 51 is available around the resonator circulating photon stream 2 for the utilization of an automated rotating beam deflector. Resonator mirrors 28 are shown with one mirror detached and remote from laser tube 6 while both mirrors are precision aligned to establish and maintain lasing. In FIG. 3 electric motor 48, when energized from power source 30, rotates photon deflector wheel 50, equipped with beveled reflectors 52 within intra-cavity circulating photon stream 2. The beveled reflectors 52 are precision spaced evenly around the circumference of deflector wheel 50 and deflector wheel 50 is positioned to allow reflectors 52 to pass in and out of circulating photon stream 2 as wheel 50 rotates. In FIG. 4 a cross-sectional frontal view of rotating photon deflector wheel 50 is depicted with beveled reflectors 52, spaces 62 between the reflectors, rotating motor axle 60, and intra-cavity circulating photon stream 2. As photon deflector wheel 50 rotates, beveled reflectors 52 move in and out of circulating stream 2 and the leading surfaces of the beveled deflectors cut through and intercept lasing photons. Spaces 62 allow for the instantaneous reestablishment of lasing and a replenished supply of photons for each transit of the beveled deflector through photon stream 2. FIG. 5 is a side view of rotating photon deflector wheel 50 depicting beveled reflectors 52, motor axle 60, intra-cavity photon stream 2, and deflected photon beams 54.

What is claimed is:

1. A pulsed laser system producing plural beam emission from momentary pulsed extraction of an intracavity circulating beam, said system comprising:
   (a) a conventional laser generator means including a resonator and a means for producing an intracavity beam;
   (b) a photon deflector means disposed within said resonator cavity for intercepting and deflecting lasing photons eminating at an angle to an optical axis of said resonator without causing power loss of said circulating beam;
   (c) means for initiating, maintaining, and controlling motion of said photon deflector such that photons traveling in either direction on either side of said deflector are deflected out of said resonator while maintaining substantially constant power within said resonator;
   (d) means for receiving, colimating, and extracting said deflected photons such that by varying rate and timing of the deflector means a colimated beam of coherent light pulses are produced.

2. A method of providing a pulsed laser system with plural beam emission from momentary pulsed extraction of the intracavity circulating beam, said system comprising:
   (a) providing a conventional laser generator means including a resonator and a means for producing an intracavity beam;
   (b) providing said laser system with a photon deflector means disposed within said resonator cavity for intercepting and deflecting lasing photons eminating at an angle to an optical axis of said resonator without causing power loss of said circulating beam;
   (c) initiating, maintaining, and controlling motion of said photon deflector such that photons traveling in either direction on either side of said deflector are deflected out of said resonator while maintaining substantially constant power within said resonator;
   (d) receiving, colimating, and extracting said deflected photons such that by varying rate and timing of the deflector means a colimated beam of coherent light pulses are produced.

3. The laser of claim one where in the laser generator means is a laser amplifier.

4. The laser of claim one where in said collimated beam is coherent.

5. The laser of claim one where in motion of said photon deflector is achieved by mechanical means.

6. The laser of claim one where in motion of said photon deflector is achieved by electromagnetic means.

7. The laser of claim one where in lasing photons are deflected from a leading edge of said photon deflector.

8. The laser of claim one where in lasing action is instantaneously reestablished after a trailing edge of said deflector moves through a photon stream.

9. The laser of claim one where in said photon deflector means is located outside of said resonator cavity.

10. The laser of claim one where in motion of said photon deflector is achieved by a vibrational transfer means.

* * * * *